(12) United States Patent
Hebibasi et al.

(10) Patent No.: US 8,320,094 B2
(45) Date of Patent: Nov. 27, 2012

(54) SURGE PROTECTION MODULE

(75) Inventors: Sonila Hebibasi, Calgary (CA); Garner Meszaros, Calgary (CA)

(73) Assignee: Circa Enterprises, Inc., Calgary, Alberta (CA)

( * ) Notice: Subject to any disclaimer, the term of this patent is extended or adjusted under 35 U.S.C. 154(b) by 385 days.

(21) Appl. No.: 12/354,997

(22) Filed: Jan. 16, 2009

(65) Prior Publication Data

US 2010/0182727 A1 Jul. 22, 2010

(51) Int. Cl.
*H01C 7/12* (2006.01)

(52) U.S. Cl. ................ 361/119; 361/111; 361/91.1

(58) Field of Classification Search .......... None
See application file for complete search history.

(56) References Cited

U.S. PATENT DOCUMENTS

| | | | |
|---|---|---|---|
| 3,840,781 A | 10/1974 | Brown | |
| 4,023,071 A | 5/1977 | Fussell | |
| 4,254,442 A | 3/1981 | Dijkmans et al. | |
| 4,544,983 A | 10/1985 | Anderson et al. | |
| 4,683,514 A | 7/1987 | Cook | |
| 4,695,916 A | 9/1987 | Satoh et al. | |
| 4,941,063 A * | 7/1990 | McCartney et al. | 361/119 |
| 4,964,160 A | 10/1990 | Traube et al. | |
| 5,034,846 A * | 7/1991 | Hodge et al. | 361/119 |
| 5,327,319 A | 7/1994 | Lee et al. | |
| 5,379,177 A | 1/1995 | Bird | |
| 5,493,469 A | 2/1996 | Lace | |
| 5,500,782 A | 3/1996 | Oertel et al. | |
| 5,523,916 A * | 6/1996 | Kaczmarek | 361/119 |
| 5,566,056 A | 10/1996 | Chaudhry | |
| 5,608,311 A | 3/1997 | Innes et al. | |
| 5,623,388 A | 4/1997 | Chaudhry | |
| 5,706,160 A | 1/1998 | Latuszkin et al. | |
| 5,712,755 A | 1/1998 | Glaser et al. | |
| 5,790,363 A | 8/1998 | Chaudhry | |
| 5,808,849 A | 9/1998 | Storbeck | |
| 5,841,620 A | 11/1998 | Masghati | |
| 5,880,919 A | 3/1999 | Napiorkowski et al. | |
| 5,896,265 A | 4/1999 | Glaser et al. | |
| 6,072,683 A | 6/2000 | Masghati | |
| 6,163,445 A | 12/2000 | Zoellick | |

(Continued)

FOREIGN PATENT DOCUMENTS

WO 98/45919 10/1998

(Continued)

OTHER PUBLICATIONS

Kamat. V., "Protection Mechanism for Modern Telecommunications"; 1997, pp. 45-50.
Anonymous, "Protection for Telecommunications Equipment", Austrian Electronics Engineering, 1995, vol. 28, Issue 10, 2 pages.
Shrive, Charles A., "Transient Voltage Surge Protection", 1996, 2 pages.

(Continued)

*Primary Examiner* — Jared Fureman
*Assistant Examiner* — Terrence Willoughby
(74) *Attorney, Agent, or Firm* — Faegre Baker Daniels LLP

(57) ABSTRACT

A surge protection module comprises a base, a plurality of first pins extending from the base to connect electrically to an upstream circuit, a plurality of second pins extending from the base to connect electrically to a downstream circuit, a fuse device acting between each first pin and a respective one of the second pins, at least one analog arrestor upstream of the fuse devices that is electrically connected across the first pins and in electrical connection to a ground terminal extending from the base, and a low capacitance solid state arrestor arrangement electrically connected to each second pin downstream of the fuse devices and to the ground terminal.

23 Claims, 4 Drawing Sheets

U.S. PATENT DOCUMENTS

| | | |
|---|---|---|
| 6,188,557 B1 | 2/2001 | Chaudhry |
| 6,195,245 B1 | 2/2001 | Kobsa |
| 6,266,223 B1 * | 7/2001 | Curry ............................ 361/119 |
| 6,298,134 B1 * | 10/2001 | Curry ............................ 379/412 |
| 6,421,220 B2 | 7/2002 | Kobsa |
| 6,608,899 B1 | 8/2003 | Spooner et al. |
| 6,731,489 B2 * | 5/2004 | Heidorn et al. ............... 361/119 |
| 7,768,761 B2 * | 8/2010 | Harris ........................... 361/111 |

FOREIGN PATENT DOCUMENTS

| | | |
|---|---|---|
| WO | 99/11957 | 3/1999 |

OTHER PUBLICATIONS

Braithwaite, I. et al., "Trends in Surge Protection of Electronic Equipment", Jul. 1-Jul. 5, 1996.

\* cited by examiner

SURGE PROTECTION MODULE

FIELD OF THE INVENTION

The present invention relates generally to telecommunications and more specifically, to a surge protection module for telecommunications equipment.

BACKGROUND OF THE INVENTION

The National Electric Code requires the telecommunications industry to provide electrical surge protection at the point of entry where external telecommunications lines enter a building. The code requires that telecommunications equipment (e.g. telephones, computers etc.) within the building be protected from three types of electrical hazards: 1) surge protection from lightning and switching surges; 2) over current protection; and 3) circuit lock-out protection for use in the event a disturbance remains on the circuit for an extended period of time.

The required protection is provided by installing a building entrance panel at the point where the outside telecommunications lines enter the building. The building entrance panel includes a surge protection module for each telecommunications circuit in the building so that each interior telecommunications circuit is protected from electrical disturbances on the external telecommunications lines. The building entrance panel further includes a means for over current protection.

Well-known surge protection modules have five (5) pins. When such a surge protection module is installed in a building entrance panel, two of its pins are in electrical communication with an interior telecommunications circuit, two of its pins are in electrical communication with the external telecommunications lines, and one of its pins is engaged with a ground terminal.

In general, there are three types of electrical surge protector modules available, notably analog surge protection modules that employ gas discharge tube (GDT) arrestors, digital surge protection modules that employ solid state arrestors, and hybrid surge protection modules that employ both GDT and solid state arrestors.

An example of a surge protection device having a modular construction so that a manufacturer can assemble the parts of the surge protection device in various combinations is disclosed in U.S. Pat. No. 6,608,899 to Spooner et al., assigned to Circa Telecom U.S.A., Ltd., the contents of which are incorporated by reference. The surge protection device includes a housing having a plurality of bores formed therein into which long pins and short pins are press fit and soldered for electrical communication with the external telecommunications lines and an internal telecommunications circuit, respectively. The housing further includes a pair of recesses into each of which may be press fit a positive temperature coefficient resistor. In one embodiment, spring clips help to hold the positive temperature coefficient resistors in place and provide needed electrical contacts. In a second embodiment, the spring clips further include an elongate part that extends to a test point opening formed in a cover of the surge protection device. The surge protection device may include either a gas discharge tube arrestor or a solid state arrestor, a fail safe device, an insulator member that is melted by the fail safe device when needed, and conductive shunt bars for use when the spring clips are not used.

Surge protection modules that employ GDT arrestors have proven to be reliable because of their ability to handle large surge currents while being resilient to extreme temperatures. Unfortunately, however, surge protection modules that employ GDT arrestors are too slow and imprecise for modern telecommunications equipment, which is sensitive to uncontrolled outside voltages.

Digital surge protection modules that employ solid state arrestors are more precise and faster than analog surge protection modules, and for their rated voltage range, are robust. However, if the rated current carrying capacity of the solid state arrestors is exceeded, digital surge protection modules suffer shortcomings. At extremely high current surges, digital surge protection modules will function once, then short to ground, after which, the digital surge protection modules must be replaced.

Hybrid surge protection modules that employ GDT and solid state arrestors in parallel combine the speed of response of solid state devices with the robustness of GDT devices. Typically, varistors are used in such hybrid surge protection modules because they can tolerate a high level of current as well as voltage spikes. Unfortunately, to-date such hybrid surge protection modules have proven to be slow, of limited durability and unsuitable for use in high-speed, high-bandwidth telecommunications circuits.

Some known surge protection modules also include protection for "sneak current". Sneak current is unwanted, weak, but steady current which seeps into telecommunications circuits and can cause heating effects and damage over time. Voltage limiting devices such as GDT and solid state arrestors are not triggered by sneak current since sneak current is not associated with a high voltage, and thus, these types of voltage limiting devices do not shunt sneak current to ground. Typically, positive temperature coefficient (PTC) resistors are used in surge protection modules to protect downstream telecommunications equipment from sneak current.

Although existing surge protection modules offer adequate protection from electrical disturbances on external telecommunications lines, improved surge protection modules that are robust, resettable and suitable for protecting high-speed and high-bandwidth telecommunications circuits are desired. It is therefore an object of the present invention at least to provide a novel surge protection module.

SUMMARY OF THE INVENTION

Accordingly, in one aspect there is provided a surge protection module comprising a base; a plurality of first pins extending from the base to connect electrically to an upstream circuit; a plurality of second pins extending from the base to connect electrically to a downstream circuit; a fuse device acting between each first pin and a respective one of said second pins; at least one analog arrestor upstream of said fuse devices that is electrically connected across the first pins and in electrical communication with a ground terminal extending from the base; and a low capacitance solid state arrestor arrangement electrically connected to each second pin downstream of said fuse devices and to said ground terminal.

In one embodiment, the low capacitance solid state arrestor arrangement comprises a solid state arrestor and a plurality of low capacitance switching circuits. The low capacitance switching circuits act between the solid state arrestor and the second pins and optionally between the solid state arrestor and the ground terminal. Each low capacitance switching circuit is a diode circuit. Each diode circuit comprises a set of diodes connecting in parallel. The solid state arrestor in one form is a thyristor.

In one embodiment, each of the fuse devices is held on the base by a biased connection. Each biased connection comprises in one form, a pair of conductive resilient clips. One of the clips acts between the respective fuse device and the respective first pin and another of the clips acts between the respective fuse device and the respective second pin. In one form, each fuse device is a positive temperature coefficient resistor and the at least one analog arrestor is a gas discharge tube.

According to another aspect, there is provided a surge protection module comprising a housing; a pair of first pins extending from one end of said housing to connect electrically to external tip and ring telecommunications lines; a pair of second pins extending from the one end of said housing to connect electrically to customer side tip and ring telecommunications lines; a ground pin extending from the one side of said housing to connect electrically to ground; an analog arrestor accommodated by said housing, said analog arrestor connected electrically across said first pins and connected electrically to said ground pin; a fuse device acting between each first pin and a respective one of said second pins, each fuse device being downstream of the analog arrestor; and a low capacitance solid state arrestor arrangement electrically connected to each second pin downstream of said fuse devices and to said ground pin.

BRIEF DESCRIPTION OF THE DRAWINGS

Embodiments will now be described more fully with reference to the accompanying drawings in which.

DETAILED DESCRIPTION OF THE EMBODIMENTS

Figure 1B:
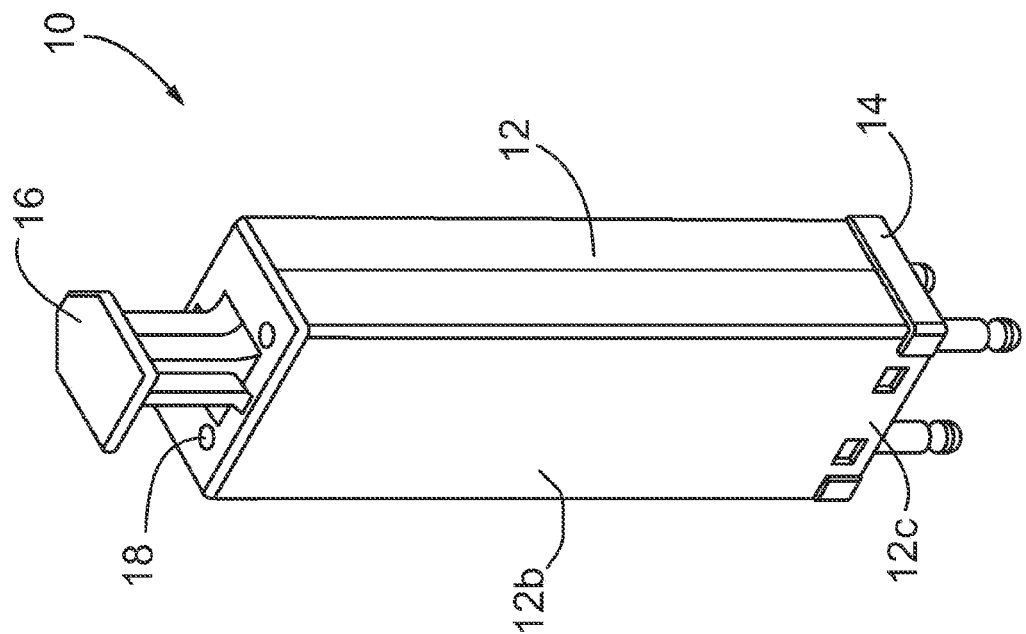
FIG. 1b is a perspective rear view of the surge protection module.

Turning now to FIGS. 1a to 3, a surge protection module is shown and is generally identified by reference numeral 10. Surge protection module 10 in this embodiment is of the five (5) pin type and is configured to be plugged into a building entrance panel that receives external telecommunications lines thereby to protect an interior telecommunications circuit from electrical disturbances on the external telecommunications lines. The surge protection module 10 is of the hybrid type and thus employs both analog and solid state arrestors. In addition, the surge protection module 10 is designed to minimize interference with communications signals passing between the interior telecommunications circuit and the external telecommunications lines. In this embodiment, the surge protection module 10 allows Category 5e communications signals to pass between the interior telecommunications circuit and the external telecommunications lines with negligible interference.

Figure 1A:
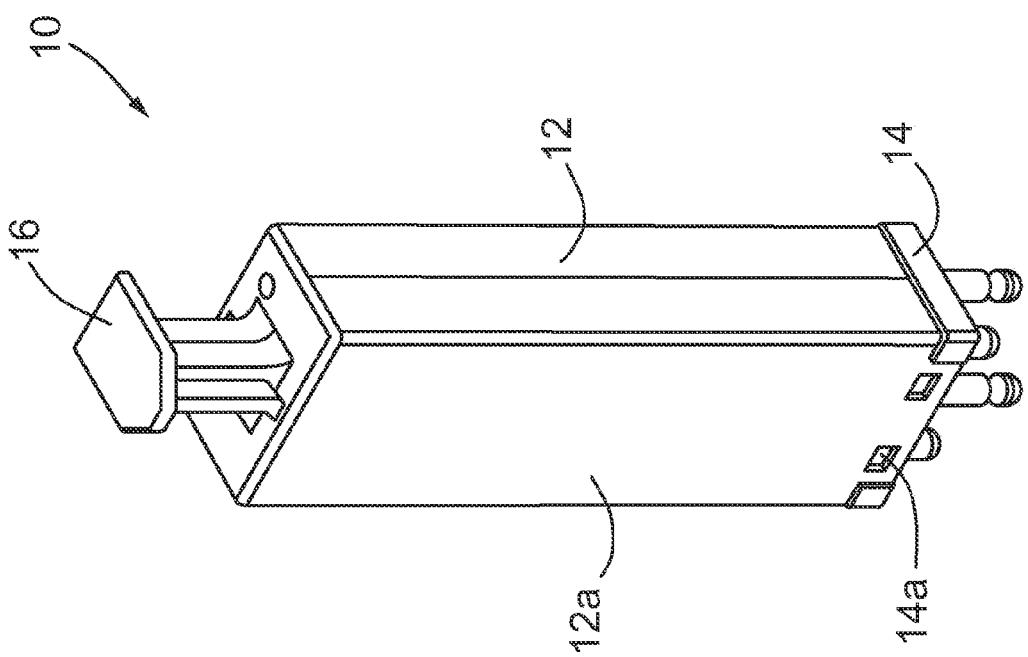
FIG. 1a is a perspective front view of a surge protection module.

As can be seen in FIGS. 1a and 1b, surge protection module 10 comprises an elongate, rectangular-shaped cover 12 that is releasably secured to a base 14 adjacent its open end to form an enclosed assembly. The elongate shape of cover 12 provides labelling surfaces 12a and 12b at least on two opposite sides of the cover. The enclosed assembly also provides a barrier to contain a fire should one occur within the surge protection module 10 as a result of an electrical overload. A handle 16 integral with the cover 14 extends from the closed end of the cover 12 to facilitate handling and installation of the surge protection module 10 into the building entrance panel. Test point accesses 18 are provided in the closed end of the housing 12 on opposite sides of the handle 16. The test point accesses 18 may be in the form of apertures or alternatively punch outs that are kept in place for those customers not ordering a surge protection module having test points but are removed for those customers ordering a surge protection module having test points. As is known, the test point accesses 18 allow a test instrument to extend into the interior of the cover 12 and contact internal components of the surge protection module 10 thereby to permit testing of the surge protection module 10 when installed in the building entrance panel without requiring disassembly of the surge protection module 10.

Flanges 12c depend from two opposite sides of the cover at its open end. Each flange 12c has a pair of laterally spaced openings 12d therein. The openings 12d receive projections 14a formed on opposite sides of the base 14 to retain the cover 12 to the base 14. The projections 14a have sloped surfaces 14b to urge the flanges 12c outwardly when the cover 12 is being pushed onto the base 14 thereby to facilitate engagement of the cover 12 and the base 14.

Figure 2:
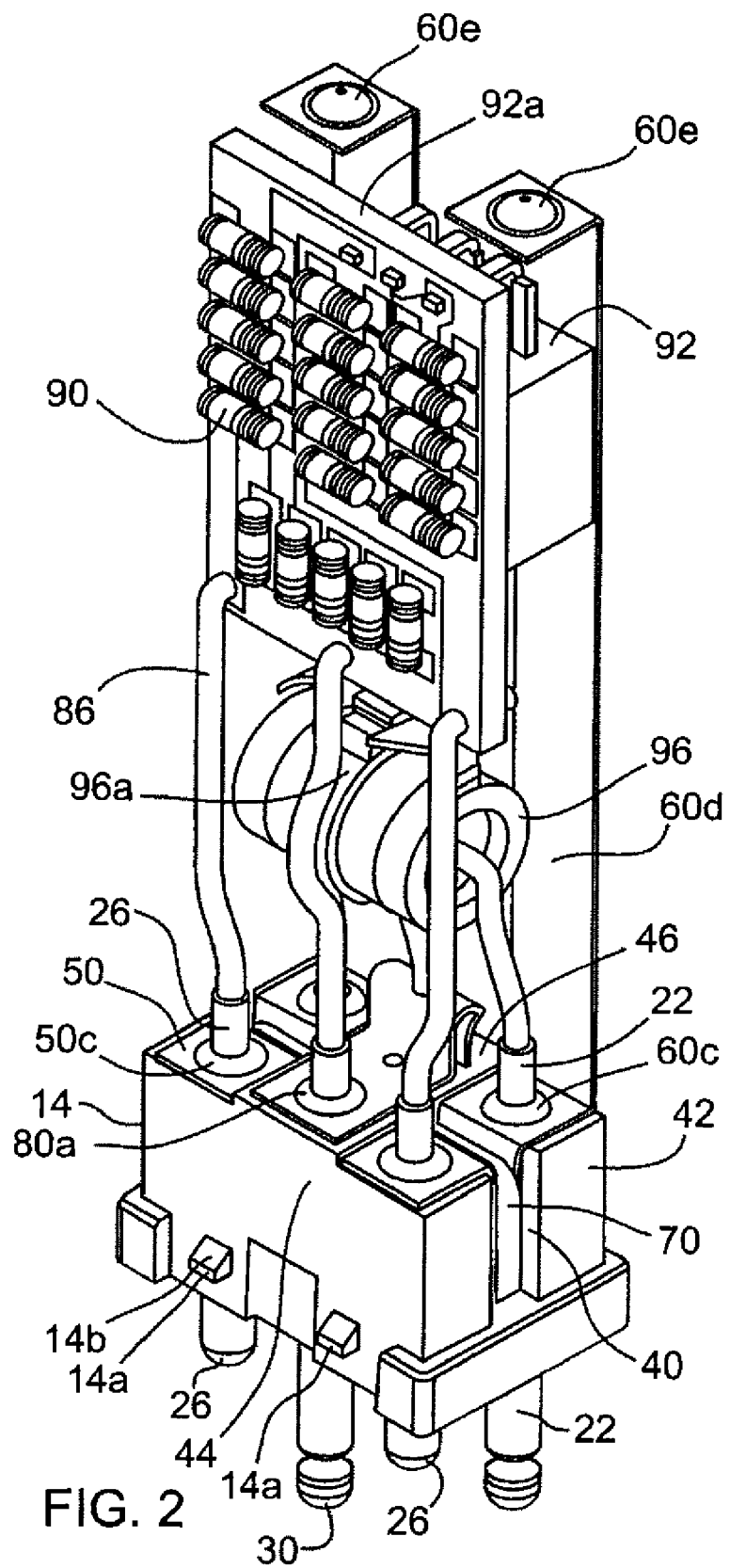
FIG. 2 is a perspective front view of the surge protection module of FIGS. 1a and 1b with the cover removed.
Figure 3:
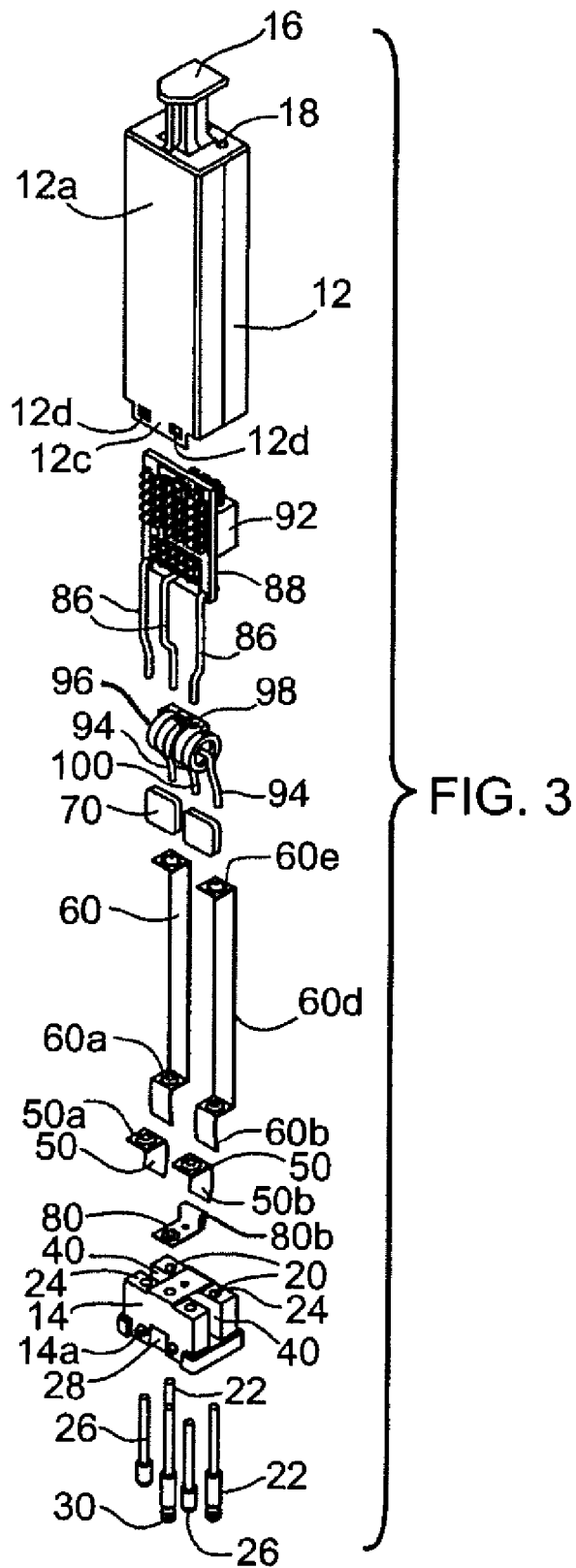
FIG. 3 is an exploded perspective front view of the surge protection module of FIGS. 1a and 1b.

FIGS. 2 and 3 better illustrate the internal components of the surge protection module 10. As can be seen, the base 14 has a plurality of bores provided therein, in this case five (5) bores. Two of the bores 20 receive long pins 22, two of the bores 24 receive short pins 26 and one of the bores 28 receives a long ground pin 30. Each of the pins 22, 26 and 30 has a smaller diameter section sized to press-fit into its respective bore and a larger diameter section that is dimensioned to exceed the diameter of its respective bore. In this manner, the larger diameter sections of the pins serve as stops to limit the extents to which the pins 22, 26 and 30 can be pushed into the bores 20, 24 and 28. The length of each pin 22, 26 and 30 is selected so that a portion of the smaller diameter section of each pin extends beyond the base 14 into the interior of the cover 12.

A pair of spaced recesses 40 is formed in the base 14 to form an "H"-shaped structure on the base 14 comprising a pair of arms 42 and 44 joined by a central bridge 46. The bores 20 that receive the long pins 22 extend through the arm 42, with each bore 20 being positioned on an opposite side of the bridge 46. The bores 24 that receive the short pins 26 extend through the arm 44, with each bore 24 being positioned on an opposite side of the bridge 46. The bore 28 that receives the ground pin 30 extends through the arm 44 adjacent the bridge 46 and is in line with the bores 24.

An "L"-shaped spring clip 50 comprising a pair of legs 50a and 50b arranged at right angles with respect to one another, is associated with each end of the arm 44. The leg 50a of each spring clip 50 overlies the top of the arm 44 and engages the short pin 26 extending through the bore 24 in that arm. In particular, the leg 50a of each spring clip 50 has a barbed central aperture 50c formed therein to facilitate entry of the respective short pin 26 but inhibit retraction of the short pin. Solder is applied between the leg 50a of each spring clip 50 and the short pin 26 extending therethrough to ensure a good electrical connection between the short pin and the spring clip. The leg 50b of each spring clip 50 runs along a sidewall of one of the recesses 40.

A test point clip 60 is associated with each end of the arm 42. One end of each test point clip 60 is configured similar to the spring clips 50 and includes a leg 60a overlying the top of the arm 42 and a leg 60b running along a sidewall of one of the recesses 40. The leg 60a of each test point clip 60 is provided with a barbed aperture 60c to engage the respective long pin 22 extending through the bore 20 in the arm 42. Solder is applied between the leg 60a of each test point clip 60 and the long pin 22 extending therethrough to ensure a good electrical connection between the long pin and the test point clip. An elongate neck 60d extends from the leg 60a and terminates at a test point surface 60e adjacent a respective test point access 18 formed in cover 12. As those of skill in the art will appreciate, the test point clips 60 can be replaced with another set of L-shaped spring clips 50 if test point accesses 18 are not provided in the cover 12.

Each recess 40 slidingly receives a fuse device 70. In this embodiment, the fuse devices 70 are positive temperature coefficient (PTC) resistors. For each recess 40, the leg 50b of the spring clip 50 and the leg 60b of the test point clip 60 that run along opposite sidewalls of the recess 40, serve to tightly engage the PTC resistor 70 in the recess. This assures good electrical and mechanical contact between each PTC resistor 70 and its associated spring and test point clips 50 and 60, respectively, without the need for leads on the PTC resistors 70 or the need for springs to hold the PTC resistors 70 in place. Thus, each PTC resistor 70 provides a fused electrical connection between one of the long pins 22 and one of the short pins 26.

A ground clip 80 overlies the bridge 46 and has a barbed aperture 80a therein adjacent one end to engage the ground pin 30 extending through the bore 28 in the arm 44. The opposite end of the ground clip 80 is shaped to define a projection 80b. The portions of the short pins 26 and the ground pin 30 that project beyond the base 14 electrically engage leads 86 extending from a printed circuit board (PCB) assembly 88. PCB assembly 88 comprises low capacitance switching circuitry, in this embodiment, three sets of diodes 90 with the diodes of each set being connected in parallel. Each set of diodes 90 electrically connects one of the leads 86 with a lead 92a of a solid state arrestor in the form of a thyristor 92. The portions of the long pins 22 that project beyond the base 14 electrically engage leads 94 extending from an analog arrestor in the form of a gas discharge tube (GDT) 96. The GDT 96 is held by a conductive retaining clip 98 that partially encircles the GDT 96 and forms an electrical contact with the central conductive band 96a of the GDT 96. A ground lead 100 extends from the retaining clip 98 and contacts the projection 80b of the ground clip 80.

Figure 4:
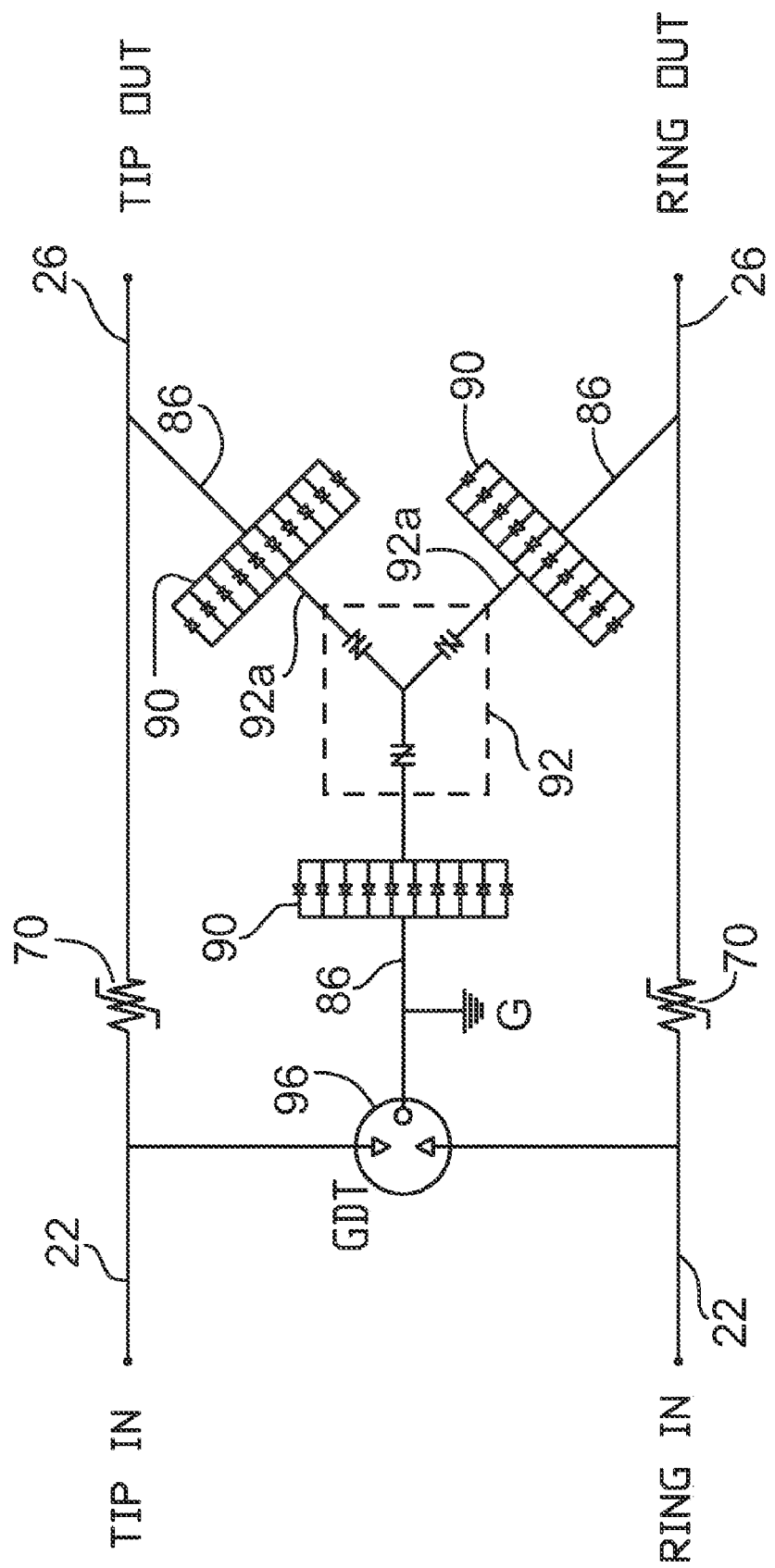
FIG. 4 is an electrical schematic illustration of the surge protection module of FIGS. 1a and 1b.

FIG. 4 is a circuit diagram illustrating the circuitry of the surge protection module 10. As mentioned above, the surge protection module 10 is of the hybrid type and employs an analog arrestor (GDT 96) and a solid state arrestor (thyristor 92). The GDT 96 as shown is electrically connected across the long pins 22 as well as to ground G. Each PTC resistor 70 electrically connects one of the long pins 22 with one of the short pins 26. Each lead 92a of the thyristor 92 is electrically connected to one set of the parallel arranged diodes 90. The diodes 90 reduce the thyristor capacitance thereby to minimize interference with communications signals passing through the surge protection device 10 between the internal telecommunications circuit and the external telecommunications lines. One set of the diodes 90 connects one lead 92a of the thyristor 92 to one of the short pins 26 while another set of the diodes 90 connects another lead 92a of the thyristor 92 to the other short pin 26. The third set of diodes 90 connects a lead 92a of the thyristor 92 to ground G.

As mentioned previously, in use the surge protection module 10 is plugged into a building entrance panel to connect an internal telecommunications circuit (i.e. the customer telecommunications equipment side) to external telecommunications lines while protecting the internal telecommunications circuit from electrical disturbances on the external telecommunications lines. As the surge protection module 10 is being plugged into the building entrance panel, the long pins 22 make electrical contact with the external tip and ring telecommunications lines before the short pins 26 make electrical contact with the internal tip and ring telecommunications lines. In this manner, the surge protection module 10 always provides protection for the internal telecommunications circuit.

With the surge protection device 10 plugged into the building entrance panel, under normal operating conditions, without power surges, the GDT 96 and the thyristor 92 are in high-impedance or "open" states. As a result, each PTC resistor 70 electrically interconnects its associated long and short pins 22 and 26, respectively, thereby connecting the internal telecommunications circuit to the external telecommunications lines. In this manner, the surge protection module 10 does not interfere with the external and internal telecommunications circuitry and allows high-speed communications signals such as Category 5e communications signals to pass with minimal interference by virtue of its low capacitive internal circuitry.

When an over-voltage condition occurs on the external telecommunications lines that exceeds the breakdown voltage of the thyristor 92, the thyristor 92 switches to a low-voltage "closed" state, shorting to ground G within 3 to 5 nanoseconds. In this manner, the over-voltage condition is inhibited from appearing on the short pins 26. In the event of a fault current appearing on the external telecommunications lines that is above a threshold, the PTC resistors 70 switch to a high-resistance "open" state thereby to isolate the short pins 26 from the long pins 22. As a result, current is channeled through the GDT 96 causing the fail-safe mechanism of the GDT 96 to melt down and short the GDT 96 to ground G. Conduction and power dissipation to ground G continues until the fault current drops below the threshold. At this time, the PTC resistors 70 return to their low-resistance "closed" state thereby to reconnect the internal telecommunications circuit downstream of the GDT 96 back to the external telecommunications lines.

As should be appreciated, the thyristor 92 and diodes 90 are placed on the interior telecommunications circuit side of the PTC resistors 70. Because PTC resistors 70 are transparent to fast voltage and current spikes or transients, the thyristor 92 reacts as if no PTC resistors are present. At slower transient speeds, the PTC resistors 70 are triggered so that the slower GDT 96 protects downstream customer telecommunications equipment.

In the embodiment described above, the low capacitance switching circuitry includes a set of diodes 90 associated with each lead 92a of the thyristor 92. If desired, the set of diodes 90 connected between the lead 92a of the thyristor 92 and ground G may be omitted.

Those of skill in the art will appreciate that the circuit configuration described above can also be used in modular surge protection modules of the type described in above-incorporated U.S. Pat. No. 6,608,899.

Although embodiments have been described with specific reference to the drawings, those of skill in the art will appreciate that modifications and variations may be made without departing from the spirit and scope thereof as defined by the appended claims.

What is claimed is:

1. A surge protection module comprising:
a base;
a plurality of first pins extending from the base to connect electrically to an upstream circuit;
a plurality of second pins extending from the base to connect electrically to a downstream circuit;

a fuse device acting between each first pin and a respective one of said second pins;

at least one analog arrestor upstream of the fuse devices that is electrically connected across the first pins and in electrical communication with a ground terminal extending from the base; and a low capacitance solid state arrestor arrangement, said solid state arrestor arrangement comprising a solid state arrestor having a first lead connected to one of said second pins downstream of said fuse device via a first diode bank, a second lead connected to another of said second pins downstream of said fuse device via a second diode bank and a third lead connected to said ground terminal via a third diode bank, wherein each of said first and second diode banks comprises a plurality of diodes electrically connected in parallel, some of the diodes of said plurality being arranged in opposite polarity to other diodes of said plurality and wherein said third diode bank comprising a plurality of diodes electrically connected in parallel, some of the diodes being arranged in opposite polarity to others of said diodes.

2. The surge protection module of claim 1 wherein said solid state arrestor is a thyristor.

3. The surge protection module of claim 2 wherein each of said fuse devices is held on said base by a biased connection.

4. The surge protection module of claim 3 wherein each biased connection comprises at least one conductive resilient clip in physical and electrical contact with the respective fuse device and one of said first and second pins.

5. The surge protection module of claim 4 wherein each biased connection comprises a pair of conductive resilient clips, one of said clips acting between the respective fuse device and the respective first pin and another of said clips acting between the respective fuse device and the respective second pin.

6. The surge protection module of claim 5 wherein each fuse device is a positive temperature coefficient resistor.

7. The surge protection module of claim 2 wherein said at least one analog arrestor is a gas discharge tube.

8. The surge protection module of claim 2 wherein said first, second and third diode banks and said thyristor are mounted on a printed circuit board assembly.

9. The surge protection module of claim 8 further comprising a cover attached to said base and housing the printed circuit board assembly and the at least one analog arrestor.

10. The surge protection module of claim 9 further comprising test point accesses provided in said cover.

11. The surge protection module of claim 2 wherein the first pins have a common length greater than a common length of the second pins.

12. The surge protection module of claim 1 wherein each fuse device is a positive temperature coefficient resistor.

13. The surge protection module of claim 12 wherein said at least one analog arrestor is a gas discharge tube.

14. The surge protection module of claim 1 wherein said at least one analog arrestor is a gas discharge tube.

15. The surge protection module of claim 14 wherein said solid state arrestor is a thyristor.

16. A surge protection module comprising:
a housing;
a pair of first pins extending from one end of said housing to connect electrically to external tip and ring telecommunications lines;

a pair of second pins extending from the one end of said housing to connect electrically to customer side tip and ring telecommunications lines;

a ground pin extending from the one side of said housing to connect electrically to ground;

an analog arrestor accommodated by said housing, said analog arrestor connected electrically across said first pins and connected electrically to said ground pin;

a fuse device acting between each first pin and a respective one of said second pins, each fuse device being downstream of the analog arrestor; and a low capacitance solid state arrestor arrangement electrically connected to each second pin downstream of said fuse devices and to said ground terminal, said solid state arrestor arrangement comprising a solid state arrestor having a first lead connected to one of said second pins downstream of said fuse device via a first diode bank, a second lead connected to another of said second pins downstream of said fuse device via a second diode bank and a third lead connected to said ground terminal via a third diode bank, wherein each of said first, second and third diode banks comprises a plurality of diodes electrically connected in parallel, some of the diodes of each said plurality of diodes being arranged in opposite polarity to other diodes of said plurality.

17. The surge protection module of claim 16 wherein said solid state arrestor is a thyristor.

18. The surge protection module of claim 16 wherein each fuse device is a positive temperature coefficient resistor.

19. The surge protection module of claim 16 wherein said analog arrestor is a gas discharge tube.

20. A surge protector comprising:
a gas discharge tube having a first lead connected to a first conductor, a second lead connected to a second conductor and a third lead connected to ground;

a solid state arrestor having a first lead connected to said first conductor via a first diode bank, a second lead connected to said second conductor via a second diode bank and a third lead connected to said ground via a third diode bank, wherein each of said first and second diode banks comprises a plurality of diodes electrically connected in parallel, some of the diodes being arranged in opposite polarity to others of said diodes and wherein said third diode bank comprising a plurality of diodes electrically connected in parallel, some of the diodes being arranged in opposite polarity to others of said diodes;

a first fuse device along said first conductor between the first lead of said gas discharge tube and the first lead of said solid state arrestor; and a second fuse device along said second conductor between the second lead of said gas discharge tube and the second lead of said solid state arrestor.

21. The surge protector of claim 20 wherein said solid state arrestor is a thyristor.

22. The surge protector of claim 20 wherein each of said first and second fuse devices is a positive temperature coefficient resistor.

23. The surge protector of claim 21 wherein each of said first and second fuse devices is a positive temperature coefficient resistor.

* * * * *